Patented Sept. 15, 1931

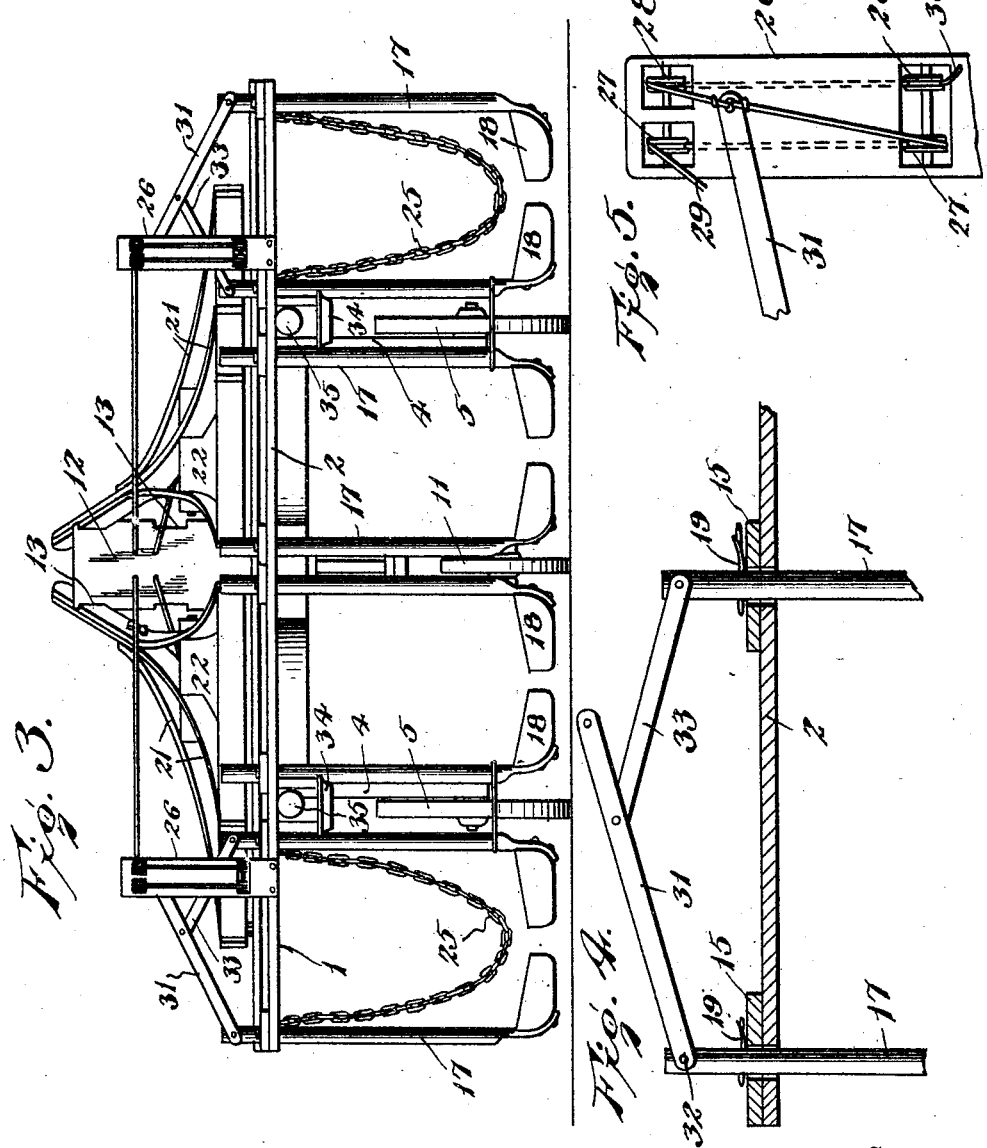

1,823,196

UNITED STATES PATENT OFFICE

ELIGY P. GRIFFITH, OF GAINESVILLE, TEXAS

BOLL WEEVIL EXTERMINATOR

Application filed January 23, 1929. Serial No. 334,585.

The present invention is directed to improvements in boll weevil exterminators, and has for its primary object to provide a device of this character so constructed that the boll weevils or other pests will be dislodged from the plants and precipitated into pans and subsequently exterminated.

Another object of the invention is to provide a device of this character so constructed that the liquid containing pans can be conveniently elevated in order to clear obstructions when the device is being moved from place to place.

Another object of the invention is to provide a device of this kind wherein the pans can be adjusted toward or away from each other.

Another object of the invention is to provide means for dislodging the weevils from the plants during travel of the device.

With these and other objects in view, this invention resides in the novel features of construction, formation, combination and arrangement of parts to be hereinafter more fully described, claimed and illustrated in the accompanying drawings, in which:—

Figure 3 is a front view.

Figure 4 is a sectional view on line 4—4 of Figure 1.

Figure 5 is a detail rear view of one of the pulley supporting plates.

Figure 1:
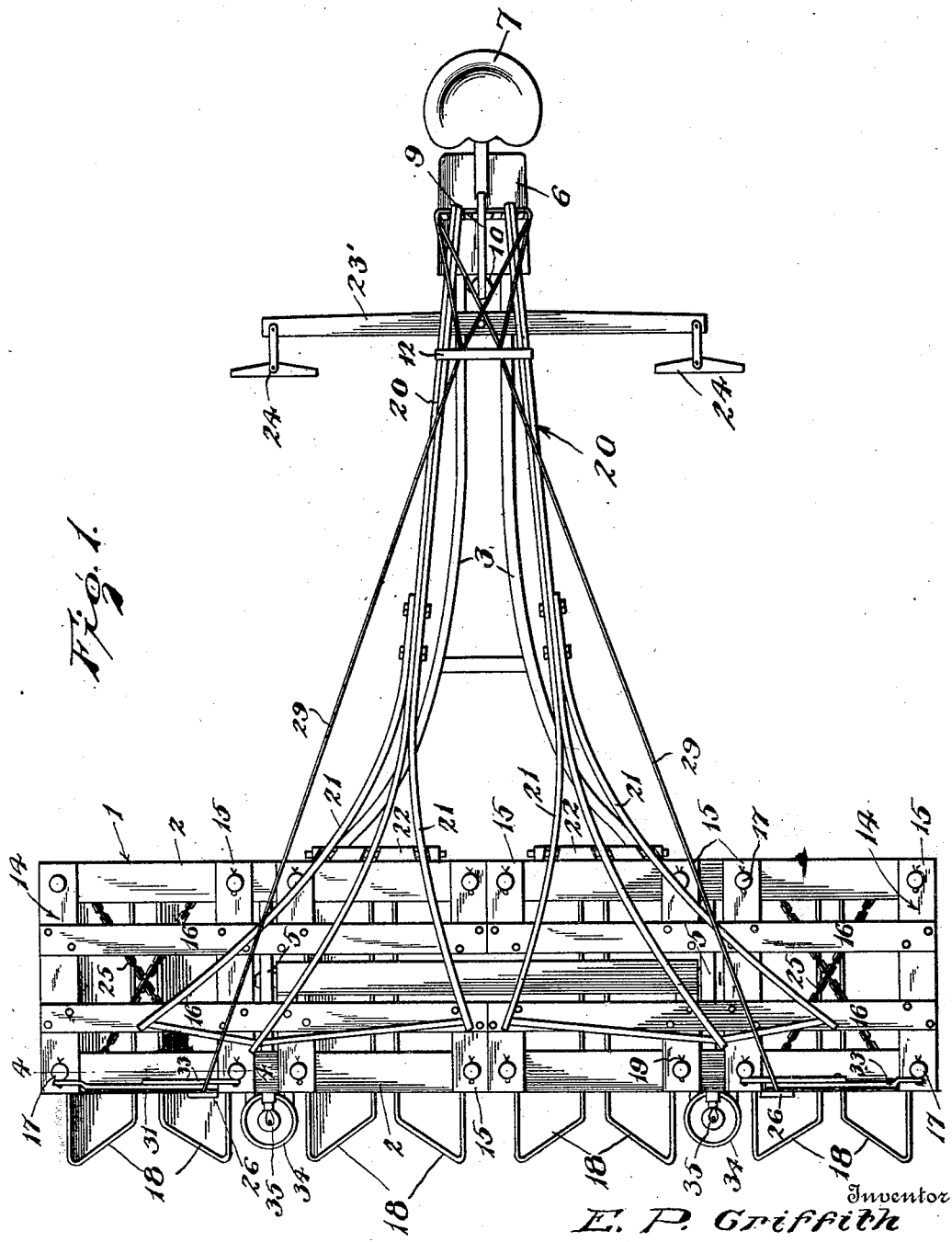
Figure 1 is a top plan view of the device.
Figure 2:
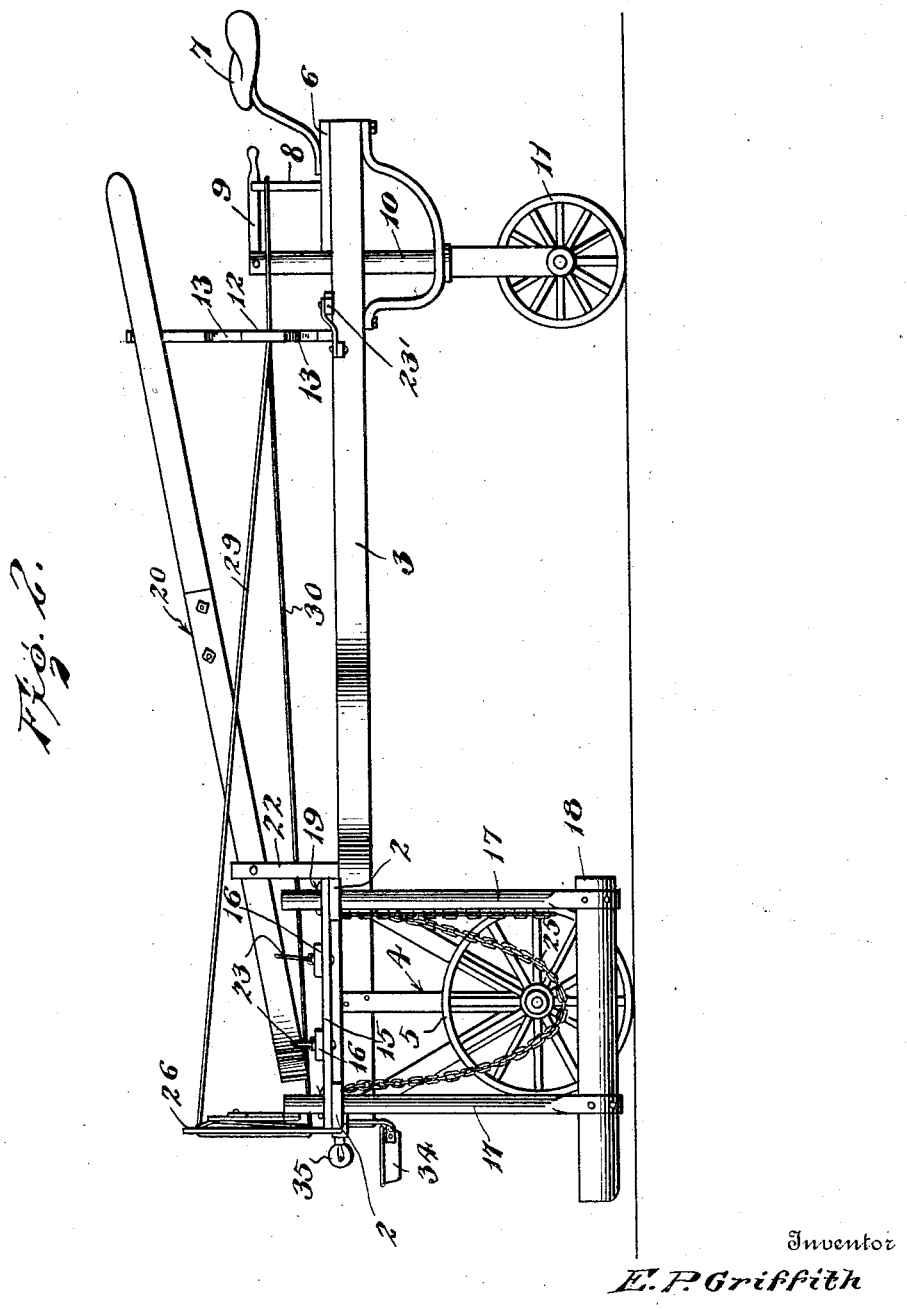
Figure 2 is a side elevation thereof.

Referring to the drawings, 1 designates a frame which consists of transverse bars 2, and having their forward ends connected to said bars are longitudinal draft beams 3, said beams having fixed thereto brackets 4 which support the ground wheels 5. A platform 6 is secured upon the rear ends of the draft beams 3 and upon the platform is supported a driver's seat 7, there being also a rack 8 upon the platform for holding the guiding handle 9. The handle is connected to the upper end of the shaft 10, the lower end of which carries the wheel 11.

A vertical plate 12 is erected on the draft beams in advance of the shaft or spindle 10, the side edges of said plate being provided with notches 13, the purpose of which will be later explained.

A pair of frames 14 are mounted upon the bars 2, each frame consisting of cross bars 15 and longitudinal bars 16. The bars 15 have engaged thereon the upper ends of the rods 17, arranged in groups of four, and to the lower ends of a pair of each group is secured a pan 18 in which oil or other fluid may be placed for killing the insects falling therein.

The upper ends of the rods have fixed thereto pins 19 resting upon bars 15 so that when the frames 14 are elevated, the rods 17, and thus the pans 18 will be also elevated in order to hold the pans elevated to clear obstructions when the machine is moved from place to place.

In order to elevate the frames a pair of levers 20 are provided, said levers including a plurality of bars 21, said bars being pivotally mounted in the standards 22 carried by the rear bar 2. Each lever is connected to one of the frames 14 by links 23. Thus it will be apparent that when the levers 20 are rocked the frames will move vertically, thereby pulling upwardly upon the rods to elevate the pans 18. The levers may be selectively engaged in the notches 13 to either hold the pans elevated or to hold the same in their operative position.

A draft bar 23' is connected with the beams 3 and to the ends of said bar are connected single trees 24 in order that draft animals can be attached to the device to propel the same over the field.

Chains 25 are supported by the bars 2 and are looped, said chains serving to drag over the plants to dislodge the insects therefrom so that they will fall into the pans 18.

It is desirable at times to swing the outer pair of pans toward or away from each other, and in order to accomplish this I provide plates 26, said plates carrying grooved pulleys 27 and 28 and cords 29 and 30 being trained about said pulleys, said cords being led backwardly through the plate 12 to the rack 8 so that the driver can conveniently manipulate them.

The terminals of the cords 29 and 30 are connected to levers 31 which are each pivotally connected to one of the rods 17, as at 32, the companion rod 17 being connected to the lever 31 by the link 33. Obviously upon pulling upon the cords the levers 31 will be rocked, thus causing the connected rods 17 to swing towards each other. In this manner the distance between certain of the pans may be conveniently regulated.

Mounted upon the front of the frame 1 are pans 34 above which are arranged bulbs 35 to attract flying pests when the device is used at night. Fluid is contained in the pans 34 to exterminate the pests attracted by the lights.

From the foregoing, it is thought that the construction, operation and many advantages of the herein described invention will be apparent to those skilled in the art, without further description, and it will be understood that various changes in the size, shape and proportion and minor details of construction, may be resorted to without departing from the spirit or sacrificing any of the advantages of the invention.

What is claimed is:—

1. A boll weevil exterminator including a transversely disposed main frame, a longitudinal draft member extending rearwardly from the transverse frame, an auxiliary frame on each end of the main frame, pairs of rods loosely mounted in the main frame and connected to the auxiliary frames for movement vertically therewith, pans at the lower ends of the rods, longitudinal levers mounted on the main frame and extending to a point adjacent the rear end of the longitudinal draft member, each of the levers comprising a plurality of bars which are forwardly divergent, and links connecting the bars with the auxiliary frames.

2. A boll weevil exterminator including a transversely disposed main frame, draft beams extending rearwardly from the main frame intermediate the ends thereof, auxiliary frames on the main frame, pairs of rods loosely mounted in the main and auxiliary frames and movable vertically with said auxiliary frames, pans at the lower ends of the rods, means for adjusting the auxiliary frames vertically and operable from the rear end of the draft beams, and means operable from the rear end of the draft beams and connected with the upper ends of a pair of rods to admit of swinging them laterally to move the pans carried thereby a greater or less distance apart.

3. In a boll weevil exterminator, a supporting frame, a pair of rods loosely mounted in the frame, pans at the lower ends of the rods, means for adjusting the rods vertically for raising and lowering the pans, a lever pivoted to the upper end of one of the rods, a link connecting the upper end of the companion rod with the said lever, upper and lower guide pulleys, cords trained around said pulleys and connected to the lever to admit of rocking the said rods to effect lateral adjustment of the pans.

4. A boll wevil exterminator comprising a transversely disposed main frame, a rearwardly disposed draft member extending from the middle portion of the main frame, auxiliary frames on the main frame, pairs of rods loosely mounted in the main and auxiliary frames, pans at the lower ends of the rods, levers mounted on the main frame and extending to a point adjacent the rear end of said draft member and connected to the auxiliary frames to admit of vertical adjustment thereof, levers connecting the upper ends of certain pairs of rods, upper and lower guide pulleys, cords trained around the guide pulleys and connected with the levers pivoted to the upper ends of the rods, and operating means for the cords to admit of swinging the rods laterally to move the pans apart a greater or less distance.

In testimony whereof I affix my signature.

ELIGY P. GRIFFITH. [L. S.]